US009011086B2

(12) United States Patent
Herrera Celaya et al.

(10) Patent No.: US 9,011,086 B2
(45) Date of Patent: Apr. 21, 2015

(54) TREATED VALVE SEAT

(75) Inventors: Aitor Herrera Celaya, Brno (CZ); Jean-Jacques Laissus, Thaon les Vosges (FR)

(73) Assignee: Honeywell International Inc., Morristown, NJ (US)

( * ) Notice: Subject to any disclaimer, the term of this patent is extended or adjusted under 35 U.S.C. 154(b) by 708 days.

(21) Appl. No.: 13/313,388

(22) Filed: Dec. 7, 2011

(65) Prior Publication Data

US 2013/0149126 A1 Jun. 13, 2013

(51) Int. Cl.
*F04D 29/44* (2006.01)
*F01D 25/24* (2006.01)
*F02B 37/18* (2006.01)
*F02B 39/00* (2006.01)

(52) U.S. Cl.
CPC .............. *F01D 25/24* (2013.01); *F02B 37/183* (2013.01); *F02B 39/005* (2013.01); *F05D 2220/40* (2013.01); *F05D 2230/90* (2013.01); *Y02T 10/144* (2013.01); *Y10T 29/49409* (2013.01)

(58) Field of Classification Search
USPC ........................ 415/144, 200, 889.2; 29/889.2
See application file for complete search history.

(56) References Cited

U.S. PATENT DOCUMENTS

| 2,757,268 | A | * | 7/1956 | Edwards | ....................... 219/641 |
| 4,451,302 | A |  | 5/1984 | Prescott | |
| 4,463,564 | A | * | 8/1984 | McInerney | ...................... 60/602 |
| 5,211,910 | A |  | 5/1993 | Pickens | |
| 6,354,001 | B1 | * | 3/2002 | Asanuma | ................... 29/888.451 |
| 6,667,111 | B2 |  | 12/2003 | Sikka | |
| 2004/0089378 | A1 | * | 5/2004 | Senkov et al. | ................ 148/417 |
| 2011/0008158 | A1 | * | 1/2011 | Boening et al. | ............... 415/200 |

OTHER PUBLICATIONS

Clauer et al., "Laser Shock Hardening of Weld Zones in Aluminum Alloys", Metallurgical and Materials Transactions A vol. 8, No. 12, 1871-1876 (1997). 6 pages.
Clauer, "Laser Shock Processing", Technical Bulletin No. 1, (2002). 24 pages.
Lumley et al., "The role of alloy composition in the heat treatment of aluminum high pressure die castings", Metalurgical Science and Technology, vol. 26-2 (2008). 10 pages.
De Kock, "Laser Heat Treating", Industrial Heating, Oct. 2001. 4 pages.
Ref. No. EN 515, Aug. 1993: "Aluminium and aluminium alloys—Wrought products—Temper designations", European Committee for Standardization. 16 pages.
Brody and Morral, "Solution Heat Treatment of Aluminum Alloys: Effect on Microstructure and Service Properties", CHTE Fall Meeting 2002, Nov. 14, 2002. 4 pages.

* cited by examiner

*Primary Examiner* — Edward Look
*Assistant Examiner* — Christopher J Hargitt
(74) *Attorney, Agent, or Firm* — Brian J. Pangrle

(57) ABSTRACT

An aluminum alloy turbine housing includes an inlet for exhaust, a turbine wheel space configured to receive exhaust via the inlet, a wastegate opening configured to receive exhaust via the inlet and to provide received exhaust to a wastegate chamber, and a locally hardened valve seat surrounding the wastegate opening. Various other examples of devices, assemblies, systems, methods, etc., are also disclosed.

18 Claims, 9 Drawing Sheets

TREATED VALVE SEAT

TECHNICAL FIELD

Subject matter disclosed herein relates generally to turbomachinery for internal combustion engines and, in particular, to treated valve seats for wastegate valves.

BACKGROUND

Wastegates for exhaust turbines may be internal or external with respect to a turbine housing. For example, an external wastegate valve may be mounted in an exhaust conduit upstream of a turbine housing to allow for exhaust gas to bypass a turbine wheel housed by the turbine housing. For vehicles with internal combustion engines, such an approach requires additional space in an engine compartment between an engine block and the turbine housing to mount the external wastegate valve and associated piping. In contrast, an internal wastegate valve is at least partially integrated into a turbine housing and may be configured to require no additional piping. For example, a turbine housing with an internal wastegate valve may be provided with a poppet that can open and close to control exhaust flow in a passage leading to a turbine wheel space where, for a closed state, exhaust entering the turbine housing is directed to the turbine wheel space and, for an open state, at least some gas entering the housing bypasses the turbine wheel space (i.e., so-called "wastegating").

As exhaust turbines may operate at quite high temperatures, often turbine housings are made from iron or an alloy with significant iron content (e.g., stainless steel). For cast iron turbine housings, features to accommodate an internal wastegate valve can add significant mass, which, in turn, can reduce fuel economy for a vehicle that must move the additional mass. Consequently, some efforts have been made to construct turbine housing from aluminum alloys in an effort to reduce mass.

Apart from the traditional challenges related to turbine housing durability (e.g., due to fatigue, cracking, creep, etc.), additional challenges exist for aluminum alloy turbine housings. A primary concern is temperature, which may be addressed by water cooling. For example, an aluminum alloy turbine housing may include its own water cooling passages or, for example, features that allow for mounting of an external cooling jacket to the housing. For aluminum alloy turbine housings with internal wastegate features, another concern relates to interaction with standard wastegate parts (e.g., as used in stainless steel turbine assemblies). A particular concern relates to behavior of an aluminum alloy turbine housing upon contact with a wastegate valve poppet.

Various techniques, technologies, etc., described herein provide for an aluminum alloy turbine housing with a valve seat having one or more properties for compatibility with a poppet. Such a valve seat may improve durability with respect to interactions with a poppet, whether during periods of operation (e.g., where exhaust flows to the housing) or even optionally during periods of non-operation (e.g., a cool-down period following use, a period of non-use, a storage period, etc.).

BRIEF DESCRIPTION OF THE DRAWINGS

A more complete understanding of the various methods, devices, assemblies, systems, arrangements, etc., described herein, and equivalents thereof, may be had by reference to the following detailed description when taken in conjunction with examples shown in the accompanying drawings where.

DETAILED DESCRIPTION

Figure 1:
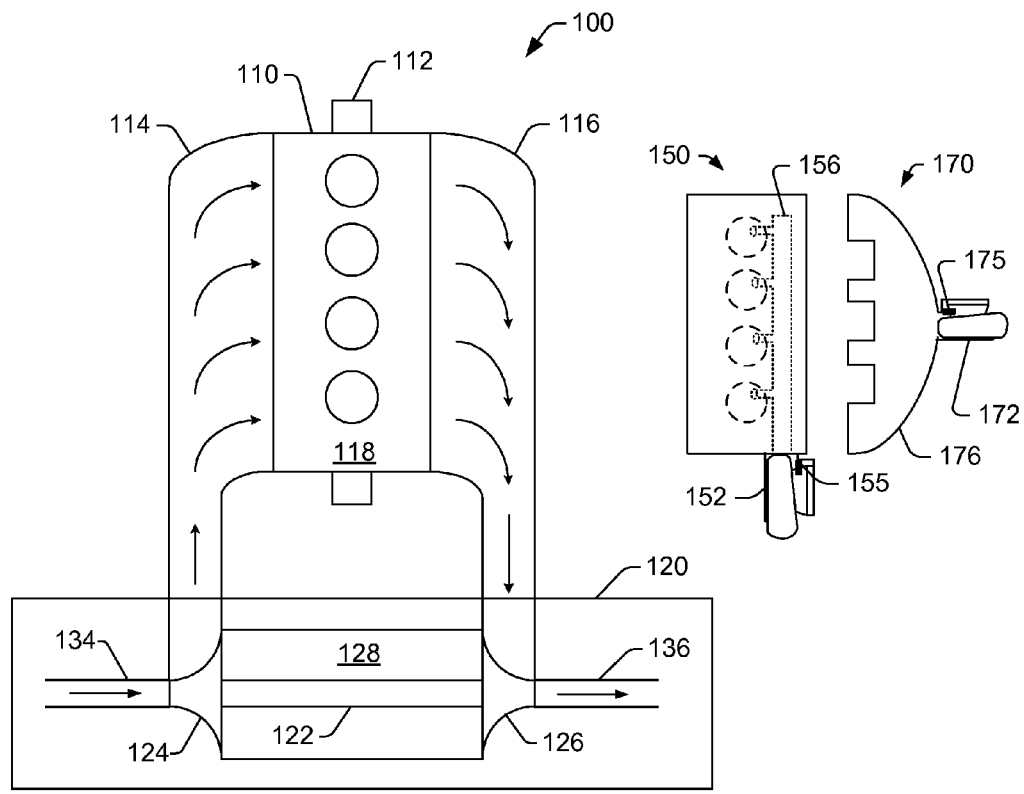
FIG. 1 is a diagram of a turbocharger and an internal combustion engine along with a controller.
Figure 1:
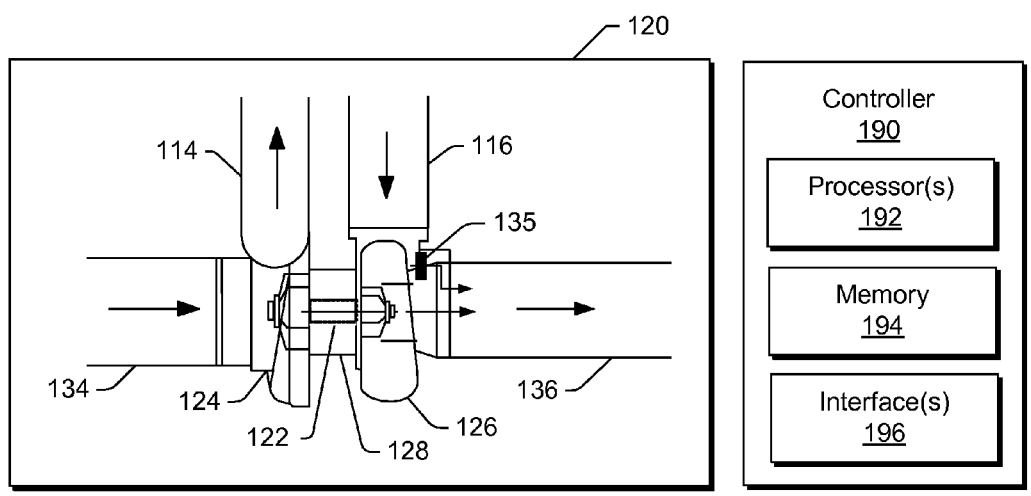

Various issues can arise due to interactions between one or more wastegate valve components and associated features of an aluminum alloy turbine housing. For example, during operation, a poppet of a wastegate valve may clap on a valve seat in response to gas pulsation, actuation position changes, engine vibrations or one or more other conditions. Such clapping can cause wear and misalignment of components. As another example, repeated open and close cycles may cause scratching of one or more components, for example, a poppet may scratch a valve seat and thereby allow exhaust to leak past between the poppet and valve seat. As yet another example, where a poppet and a valve seat are constructed from different materials, corrosion may occur (e.g., galvanic corrosion). Such corrosion can degrade surfaces, typically those containing aluminum, and may vary with respect to operational conditions and even environmental conditions (e.g., humidity, salinity, electrical potentials, temperature, etc.). One approach to addressing such interactions may be to redesign or otherwise modify a poppet or associated components. Another approach may be to provide a valve seat insert, for example, constructed from stainless steel. As described herein, various other approaches can be taken, for example, approaches that include treating a valve seat of an aluminum alloy turbine housing.

As described herein, a valve seat of an aluminum alloy turbine housing may be subject to one or more local treatments to improve mechanical properties and, for example, to dismiss a need for modifying an existing poppet, arm and valve system or inserting a special separate seat component (e.g., a stainless steel insert). Accordingly, an aluminum alloy turbine housing may include a valve seat for an internal wastegate where the valve seat has been treated by one or more treatment processes to account for interactions with a poppet or other type of valve plug.

As described herein, a turbine housing may be formed in various manners and with various shapes. For example, a turbine housing may be cast integral to an exhaust manifold or a cylinder head where the cylinder head defines the housing and one or more passages leading from a combustion chamber to the housing. In general, such arrangements can reduce mass, number of parts, etc.

As described herein, various treatment techniques can be applied to a valve seat for a wastegate poppet to account for operational or environmental conditions related to the turbine housing being integral to an exhaust manifold or a cylinder head. For example, where a turbine housing is integral to an aluminum alloy cylinder head, one or more treatments may be applied to the entire cylinder head (e.g., global treatment), one or more treatments may be applied to a portion thereof (e.g., local treatment), or a combination of both global treatment and local treatment may be applied. In the foregoing example, one or more treatments may be tailored for a valve seat portion that functions as part of a wastegate mechanism and one or more treatments may be tailored for portions that function as part of a cylinder head (e.g., portions for a head gasket, domed chamber, chamber intake, chamber exhaust, etc.). As described herein, localized treatment of a valve seat portion of a component may be tailored to avoid application of that treatment to one or more portions of that component that provide other functions.

Below, a description of a turbocharger is provided followed by examples of turbine housings and assemblies as well as examples of techniques and equipment for locally treating a valve seat of a turbine housing.

Turbochargers are frequently utilized to increase output of an internal combustion engine. Referring to FIG. 1, a conventional system 100 includes an internal combustion engine 110 and a turbocharger 120. The internal combustion engine 110 includes an engine block 118 housing one or more combustion chambers that operatively drive a shaft 112 (e.g., via pistons). As shown in FIG. 1, an intake port 114 provides a flow path for air to the engine block 118 while an exhaust port 116 provides a flow path for exhaust from the engine block 118.

Also shown in FIG. 1, the turbocharger 120 includes an air inlet 134, a shaft 122, a compressor 124, a turbine 126, a housing 128 and an exhaust outlet 136. The housing 128 may be referred to as a center housing as it is disposed between the compressor 124 and the turbine 126. The shaft 122 may be a shaft assembly that includes a variety of components. In operation, the turbocharger 120 acts to extract energy from exhaust of the internal combustion engine 110 by passing the exhaust through the turbine 126. As shown, rotation of a turbine wheel 127 of the turbine 126 causes rotation of the shaft 122 and hence a compressor wheel 125 (e.g., impeller) of the compressor 124 to compress and enhance density of inlet air to the engine 110. By introducing an optimum amount of fuel, the system 100 can extract more specific power out of the engine 100 (e.g., compared to a non-turbocharged engine of the same displacement). In the example of FIG. 1, a wastegate valve 135 is positioned proximate to the inlet of the turbine 126. The wastegate valve 135 can be controlled to allow exhaust from the exhaust port 116 to bypass the turbine 126.

As mentioned, a turbine housing may optionally be integral to a component such as a cylinder head 150 or an exhaust manifold 170. As shown in FIG. 1, the cylinder head 150 includes a passage 156 for flow of exhaust from combustion chambers to an integral turbine housing 152 that includes a wastegate 155; and the exhaust manifold 170 includes an exhaust collection portion 176 configured to collect and direct exhaust to an integral turbine housing 172 that includes a wastegate 175.

In FIG. 1, an example of a controller 190 is also shown as including one or more processors 192, memory 194 and one or more interfaces 196. Such a controller may include circuitry such as circuitry of an engine control unit. As described herein, various methods or techniques may optionally be implemented in conjunction with a controller, for example, through control logic. Control logic may depend on one or more engine operating conditions. The controller 190 may be configured to control a variable geometry assembly, a wastegate, an electric motor, or one or more other components associated with an engine, an exhaust turbine (or exhaust turbines), a turbocharger (or turbochargers), etc. With respect to a wastegate, the controller 190 may be configured to act as an actuator or to transmit a signal to an actuator configured to actuate, for example, the wastegate valve 135 (e.g., to close or open a wastegate).

Figure 2:
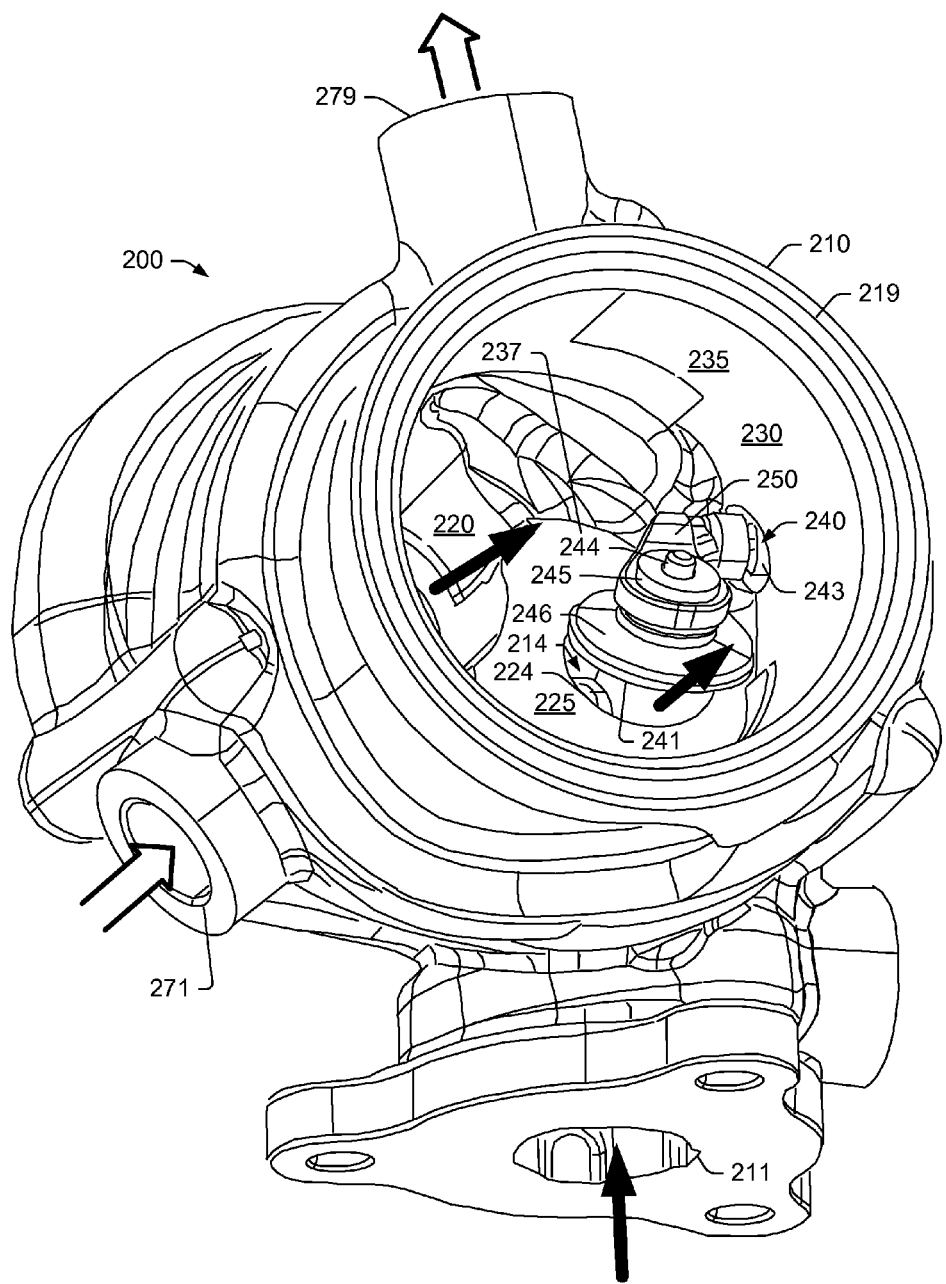
FIG. 2 is a perspective view of an example of an assembly with a wastegate.
Figure 3:
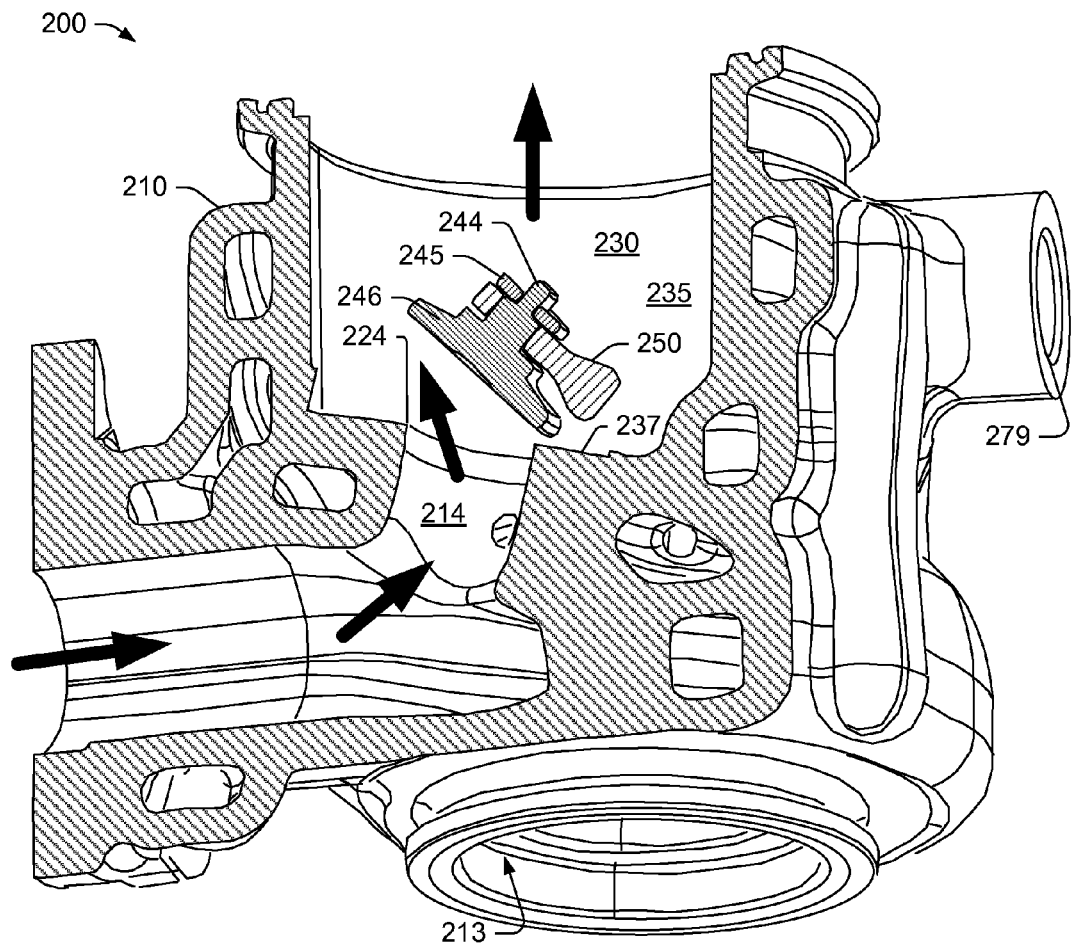
FIG. 3 is a cross-sectional view of the assembly of FIG. 2.
Figure 3:
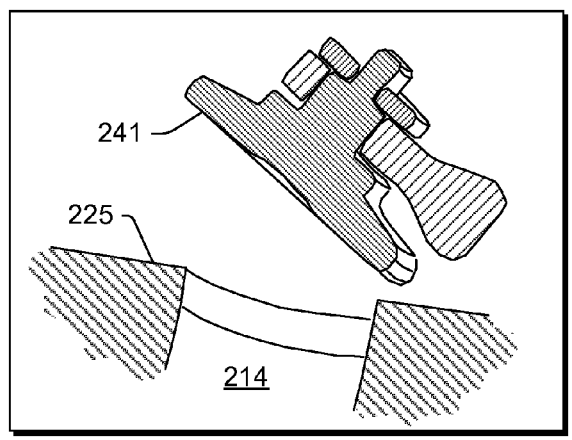
Figure 3:
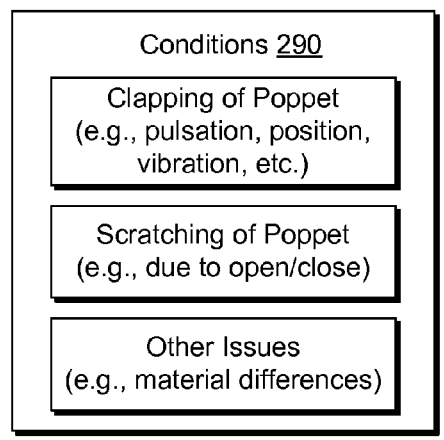

FIGS. 2 and 3 show a perspective view and a cross-sectional view, respectively, of an example assembly 200 that includes a wastegate. As shown, the assembly 200 includes a housing 210, an exhaust flow passage 220, a wastegate chamber 230 and a wastegate valve control mechanism 240 for controlling flow of exhaust via an opening 224 of an exhaust wastegate passage 214 where the passages 214 and 220 are in communication with an exhaust inlet 211. In the example assembly 200 of FIGS. 2 and 3, the exhaust flow passage 220, which is configured to receive exhaust from a turbine wheel space 213, joins the wastegate chamber 230, which has an exhaust exit 219. Accordingly, exhaust passing to a turbine wheel disposed in the turbine wheel space 213 and on to the exhaust flow passage 220 can exit the housing 210 via the exit 219 and exhaust bypassing the turbine wheel via the passage 214 can exit the housing 210 via the exit 219. In any partially open states of the wastegate valve, exhaust from both passages 214 and 220 can exit the housing 210 via the common exit 219.

As shown in FIGS. 2 and 3, the wastegate chamber 230 is defined at least in part by a cylindrical wall 235 and a bottom wall 237 both of which may be part of a unitary, cast component. In the example shown, the bottom wall 237 is substantially planar and includes a valve seat 225 that surrounds the opening 224 of the passage 214.

In the example of FIGS. 2 and 3, the housing 210 also includes cooling fluid passages with, for example, at least openings 271 and 279, which may be an inlet and an outlet or otherwise arranged for flow of cooling fluid through the housing 210. In general, such cooling passages allow for temperature control of a housing during operation, which may be necessary or desirable when the housing is constructed of an aluminum alloy.

In the example of FIGS. 2 and 3, the wastegate control mechanism 240 includes a shaft 243 (e.g., for attachment to a control arm, rod, etc.) and a poppet arm 250 for moving a poppet 246 between a fully closed position and a fully open position. While the poppet 246 and the arm 250 are shown as separate components, as described herein, a poppet and an arm may be a unitary component. As shown in FIG. 2, the poppet 246 is connected and attached to the poppet arm 250 via a peg or stem 244 and washer 245. The stem 244 may be an extension of the poppet 246 or a separate component that attaches to the poppet 246.

In a closed position of the wastegate valve, a bottom surface 241 of the poppet 246 contacts the valve seat 225 that surrounds the opening 224 of the passage 214. As mentioned, various interactions can occur between the poppet 246 and the valve seat 225. FIG. 3 shows some conditions 290 that may occur, including clapping of the poppet 246 against the valve seat 225, scratching of the poppet 246 or the valve seat 225 and other issues (e.g., due to material differences between the material of construction of the surface 241 of the poppet 246 and the material of construction of the valve seat 225). As described herein, issues addressed through one or more treatments may include various forms of wear, sticking due to material affinity, or others that may affect controllability of a wastegate valve.

As described herein, one or more treatments may be applied to the turbine housing, for example, before delivery of the housing part to an assembly supplier. As described herein, one or more treatments might be applied over a cast part or over a machined part. In various examples, a part may be both cast and machined. For example, a turbine housing may be cast from an aluminum alloy where machining forms one or more features (e.g., a passage, an opening, a valve seat, etc.). As described herein, one or more treatments may be applied locally on to areas where contact with a poppet will exist. As shown in FIGS. 2 and 3, the valve seat 225 may be such an area. As described herein, a process may include a quality control test to ascertain quality of an area subject to one or more treatments (e.g., to determine hardness, surface condition, electrical conductivity, etc.).

Figure 4:
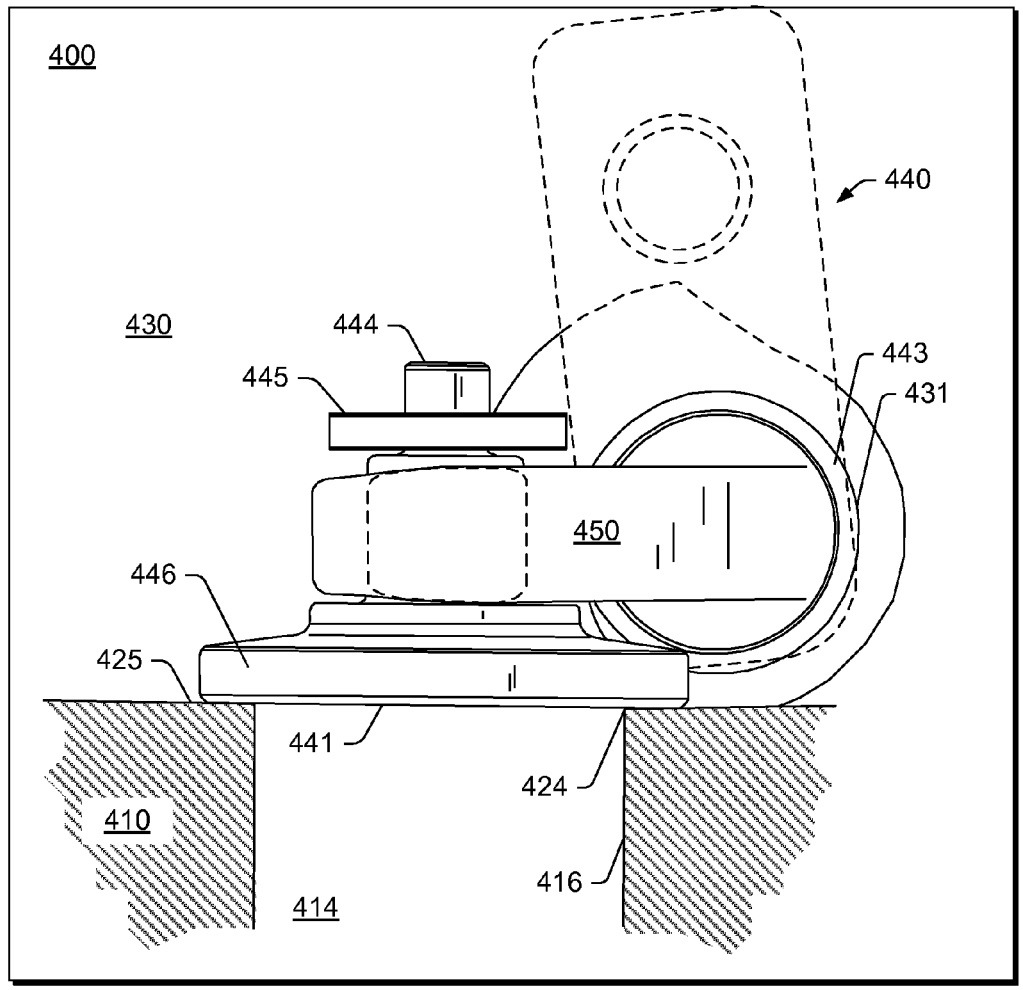
FIG. 4 is a cross-sectional view of an example of an assembly with a wastegate.

FIG. 4 shows a side view of an example of an assembly 400 that includes a wastegate valve. As shown, an aluminum alloy component 410 includes an exhaust passage 414 defined by a wall 416 that leads to an opening 424 surrounded by a valve seat 425 (e.g., a valve seating surface). In the example of FIG. 4, a poppet 446 is attached to an arm 450, seated in a wastegate chamber 430, via components such as a stem 444 and a washer 445. As shown, a control mechanism 440 can provide for rotation of the arm 450 about a shaft 443 seated in a bore 431 to move the poppet 446 between open and closed positions. In the closed position, a lower surface 441 of the poppet 446 contacts the valve seat 425 to thereby hinder flow from the passage 414 to the chamber 430. The lower surface 441 may have a partially spherical section at or near its center, which may help dissipate forces due to exhaust pulsation in the passage 414. Around such a section is typically an annular surface configured to contact the valve seat 425 to thereby seal the exhaust passage 414 from the wastegate chamber 430.

As described herein, various issues can arise during operation, which lead to exhaust leakage from a wastegate passage to a wastegate chamber (e.g., from the passage 414 to the chamber 430). As shown in FIG. 4, the valve seat 425 of the component 410 is substantially planar and surrounds the opening 424 and a planar portion of surface 441 of the poppet 446 has a perimeter that exceeds the perimeter of the opening 424. To effectively seal the opening 424, a portion of the surface 441 of the poppet 446 must seat evenly against the valve seat 425 of the component 410. In other words, to seal the opening 424, at least a portion of the surface 441 of the poppet 446 must be parallel to and in contact with the valve seat 425 of the component 410. Aforementioned interactions can degrade the ability of the valve seat 425 to properly seat the poppet 446, which can lead to controllability issues (e.g., leakage of exhaust from the passage 414 to the chamber 430).

Forces that can cause such degradation include aerodynamic excitation, high temperatures, temperature cycling (e.g., temperatures <−20 degrees C. to >1000 degrees C.), chemical attack, friction, deterioration of materials, current, potential differences, etc. For at least the foregoing reasons, it can be difficult to maintain effective sealing of a wastegate opening over the lifetime of an exhaust turbine assembly.

Figure 5:
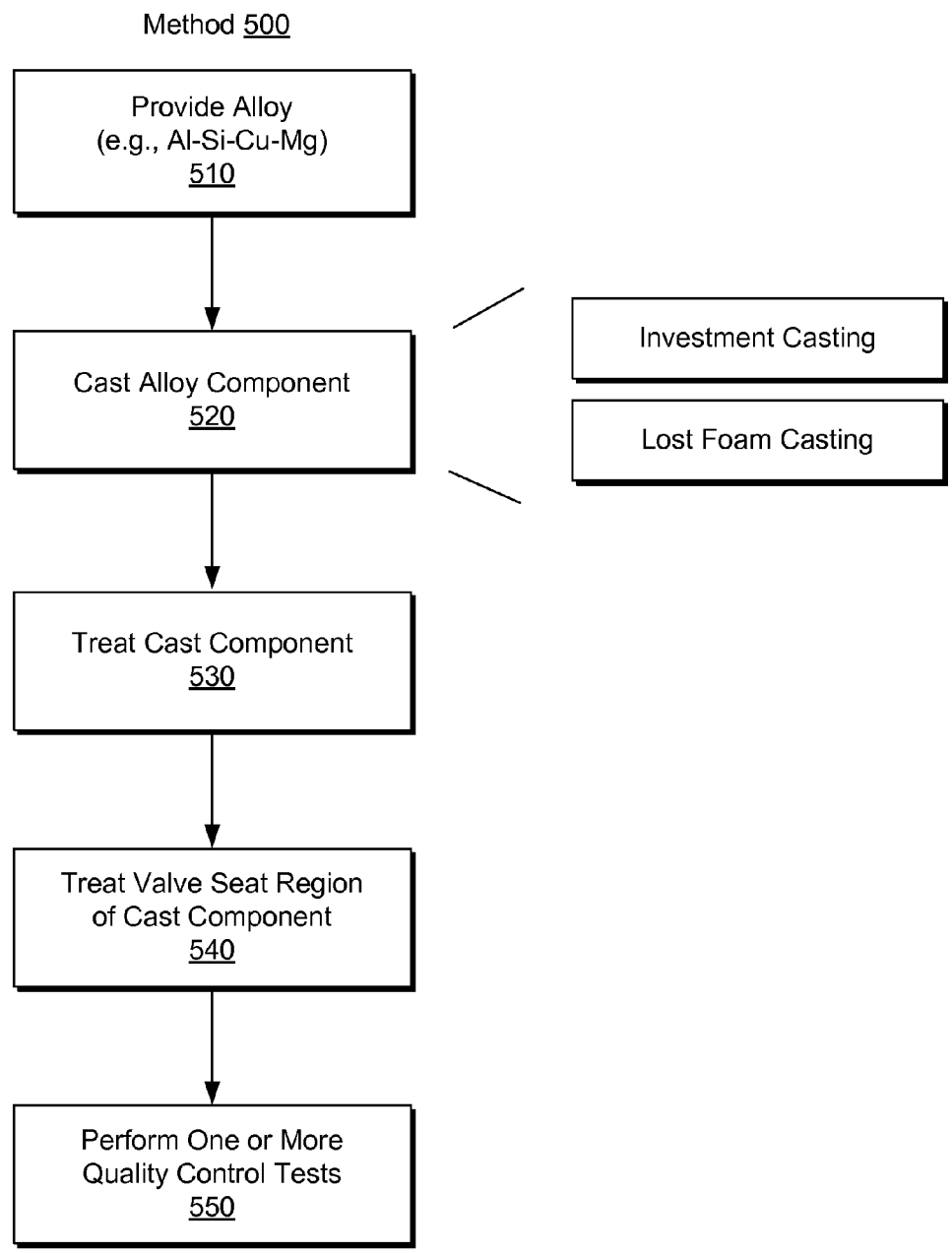
FIG. 5 is a block diagram of an example of a method for globally and locally treating a component.

FIG. 5 shows a block diagram of a method 500 that includes a provision block 510 for providing an alloy, a cast block 520 for casting a component, a treatment block 530 for globally treating the component, a treatment block 540 for locally treating a valve seat region of the component and a performance block 550 for performing one or more quality control tests (e.g., to test quality of the locally treated valve seat).

As described herein, an alloy may be an aluminum alloy such as an aluminum alloy that includes one or more of the following: bismuth, copper, chromium, gallium, iron, lead, magnesium, manganese, nickel, silicon, titanium, vanadium, zinc and zirconium. For example, an alloy may include aluminum, silicon, copper and magnesium and have a stoichiometric relationship as follows: $AlSi_5Cu_3Mg$. An aluminum alloy may be a "Y alloy", which includes at least some nickel.

In general, aluminum alloys with copper of the series designation 20000 are age-hardenable with poor resistance to corrosion, aluminum alloys with silicon of the series designation 40000 have corrosion resistance characterized based on whether they include copper (e.g., typically poor for high copper) or magnesium (e.g., typically good), aluminum alloys with magnesium of the series designation 50000 have good resistance to atmospheric corrosion, and aluminum alloys with zinc of the series designation 70000 have fair resistance to corrosion.

As described herein, casting may be, for example, investment casting, lost foam casting or other type of casting. Investment casting typically involves flowing a molten alloy into a shell such as a hollow ceramic shell. As the shell may be made from a wax pattern, which is subsequently remove (e.g., via melting), at times, investment casting is referred to as lost-wax casting.

A conventional investment casting process can include pattern creation, mold creation, pouring (e.g., via force of gravity, vacuum, pressure, etc.), cooling, casting removal, and finishing (e.g., grinding, sandblasting, etc., to smooth a component). In general, an investment casting process involves use of a metal die, wax, ceramic slurry, furnace, molten metal, and any of a variety of machines for sandblasting, cutting, or grinding (as appropriate or desired).

With respect to lost foam casting, such a process may include patterning via use of a foam (e.g., expendable polystyrene beads), coating a pattern with a refractory wash coat, forming a mold by compacting material (e.g., dry sand) around a coated pattern (e.g., as set in a flask), pouring molten alloy into the mold with vaporization of the foam, shaking out, and finishing of the cast component.

With respect to treating a cast component by a process that effectively treats the entire component, such a process may include one or more of the following: solution heat treatment (e.g., for dissolution of soluble phases), quenching (e.g., for development of supersaturation), and age hardening (e.g., precipitation of solute atoms either at room temperature, often referred to as natural aging, or at elevated temperature, often referred to as artificial aging or precipitation heat treatment).

As described herein, heat treating can include any of a variety of heating operations or cooling operations performed for purposes of changing mechanical properties, metallurgical structure, or residual stress state of a metal or alloy component. As to aluminum alloys, however, the term heat treating often refers more specifically to one or more operations performed to increase strength and hardness of precipitation-hardenable cast alloys.

An aluminum alloy that can be precipitation hardened, may be referred to as a "heat-treatable" alloy; noting that some aluminum alloys demonstrate no significant strengthening by heating or cooling and may be referred to as "non heat-treatable" alloys, which may depend primarily on cold work to increase strength. In general, heating to decrease strength and increase ductility (annealing) may be used with heat-treatable or non-heat-treatable aluminum alloys.

An attribute of a precipitation-hardening alloy is temperature-dependent equilibrium solid solubility, characterized by increasing solubility with increasing temperature. A general requirement for precipitation strengthening of supersaturated solid solutions involves formation of finely dispersed precipitates during aging heat treatment (which may include either natural aging or artificial aging). Many heat-treatable alloys are based on ternary or quaternary systems with respect to solutes involved in developing strength by precipitation.

As to aforementioned Y alloy, Y alloy age hardens at typical ambient temperatures after solution heat treating. For example, a heat treatment may heat a Y alloy to about 500 to about 52° C. for about 6 hours, then allow for natural aging for about 7 to about 10 days. In such an example, precipitation hardening takes place during ageing to form precipitates of both $CuAl_2$ and $NiAl_3$. For Y alloy, when cast, chill casting may be favored over sand casting as chill casting can provide for finer structure that is more amenable to heat treatment.

Standard temper designations for aluminum alloys can be characterized by NF EN 515 or NF EN 1706 codes such as "F", which indicates "as fabricated", "O", annealed (e.g., above 350 C) and a variety of "T" codes such as T7, which indicates "solution heat treated and stabilized" or "solution heat treatment, quenching and over-ageing (stabilization)" while T79 indicates "very limited over-ageing" and T73 indicates "fully over-aged condition to achieve the best stress corrosion resistance". Another standard exists, a so-called AFNOR designation (also NF A 57 702) that relies on "Y" codes, not to be confused with Y alloy. For example, the AFNOR code Y33 refers to die casting (i.e., Y3X) and "solution heat treatment, quenching and peak ageing" or "solution heat treatment, quenching and under-ageing" while the AFNOR code Y23 refers to either of the same treatments but for sand casting (i.e., Y2X). As described herein, an alloy may be $AlSi_5Cu_3Mg$ and designated T7 or Y33.

Figure 6:
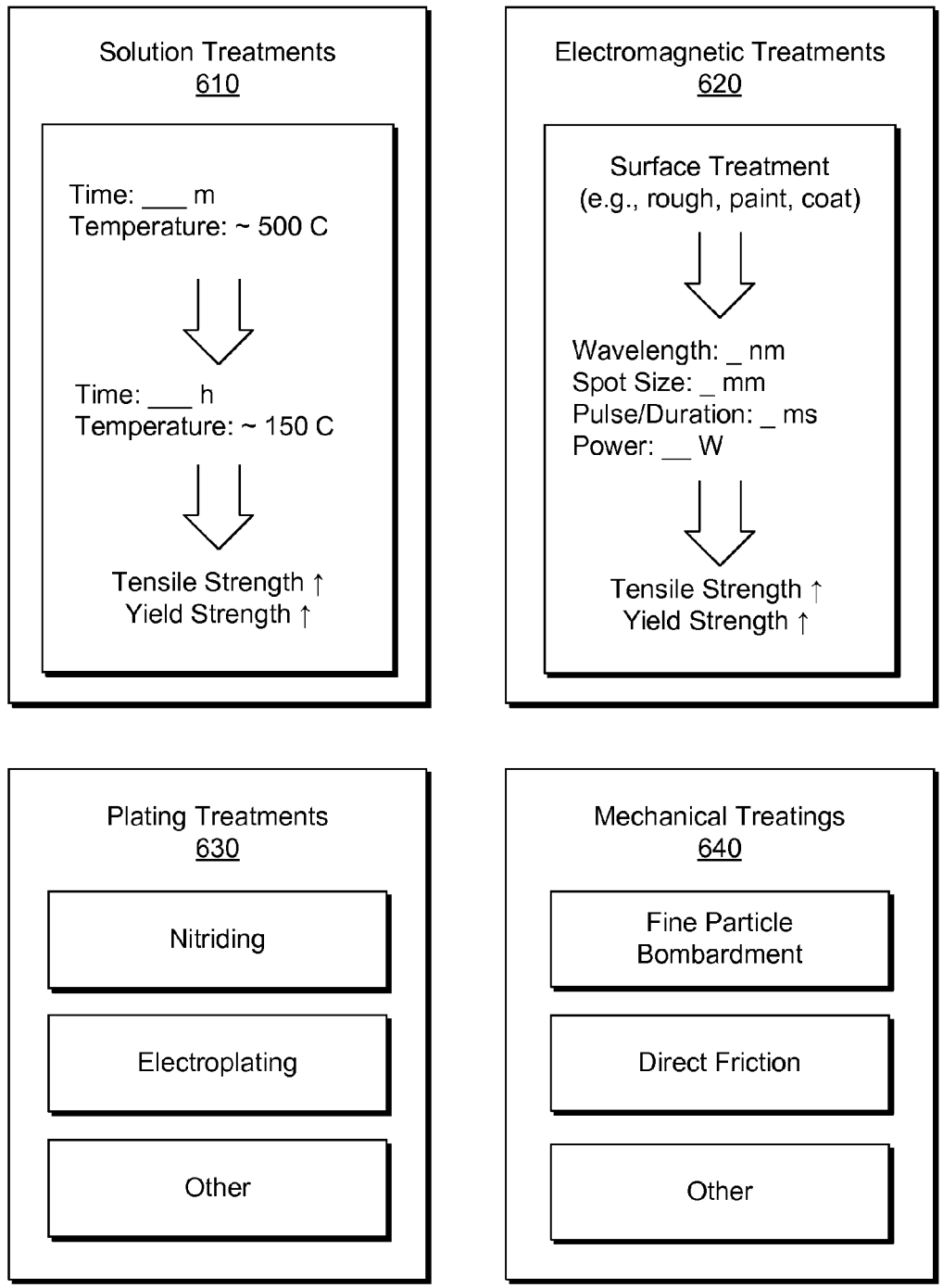
FIG. 6 is a block diagram of various examples of treating or treatments.

FIG. 6 shows some examples of treatments, including solution treatments 610, electromagnetic treatments 620, plating treatments 630 and mechanical treatments 640. As described herein, such treatments may optionally be applied locally. In FIG. 6, the blanks for the solution treatments 610 and the electromagnetic treatments 620 may be considered some selectable variables to tailor a particular example of a solution treatment or a particular example of a electromagnetic treatment.

Various solution treatments have been mentioned, which are directed generally to chemical composition or states of components in an alloy (e.g., phases, sizes, porosity, etc.) where the alloy is treated as a "solution". As shown, heat treatment can be a form of solution treatment where a portion of a component is heated to a target temperature for a particular duration and followed by aging where the component is maintained at a lower temperature for a period of time. As indicated, such an approach may increase tensile strength and yield strength. Also, as mentioned, certain heat or solution treatments can increase corrosion resistance, which may benefit a valve seat, for example, whether corrosion caused by interaction with a poppet material, corrosion caused by exhaust, or a combination of both types of corrosion. As described herein, solution or heat treatments can include cooling or quenching as well as heating.

As to electromagnet treatments 620, such treatments can include any of a variety of techniques where electromagnetic radiation is directed to a valve seat of a component such as a turbine housing cast from an aluminum alloy.

An electromagnet treatment may include a preliminary surface treatment whereby a surface is roughed, polished, coated, painted, etc., which may facilitate a subsequent process. As to laser treatment, a process may select a wavelength or range of wavelengths, a spot or beam size, a pulse or duration and a power level or power density to be applied. Such a process may provide for heating, chemical reactions, etc., to, for example, increase tensile strength, yield strength, improve resistance to corrosion, etc. With respect to surface treatment, a surface treatment such as a coating may provide for certain absorption of electromagnetic energy or tailoring of transmission of such energy to an aluminum alloy component (e.g., consider vaporization of a paint layer for control of a shock wave). For example, an opaque coating may allow for transmission of some energy while reducing risk of or extent of any undesirable surface melting of an aluminum alloy component (see, e.g., Clauer et al., Laser shock hardening of weld zones in aluminum alloys, Metallurgical Transactions A, Volume 8, Issue 12, pp. 1871-1876, 1997, which is incorporated by reference herein).

As to plating treatments 630, such treatments can include, for example, nitriding, electroplating, or other types of plating. As to nitriding, a process may include application of a laser to a surface such as a valve seat in a nitrogen environment where the nitriding process is, for example, as or akin to that described in U.S. Pat. No. 4,451,302 to Prescott et al. ('302 patent), which is incorporate by reference herein. The '302 patent describes various laser hardening processes and, specifically, a process for forming aluminum nitride on an aluminum alloy surface using a laser in a nitrogen enriched environment where the alloy has particular composition (e.g., less than 2.1 percent by weight magnesium). Such an approach provided a hardened aluminum alloy component with a finely defined region, area, or zone of hardness. Accordingly, as described herein, a plating treatment may include use of a laser or other electromagnetic energy.

As to mechanical treatments 640, such treatments can include, for example, fine particle bombardment and direction friction. For example, silica sand or other particles may be shot at a valve seat to impart material properties beneficial for interactions between the valve seat and a poppet of a wastegate valve. As described herein, a treatment may involve so-called superfinishing or nano-finishing (e.g., to achieve a surface with nanoscale characteristics).

Figure 7:
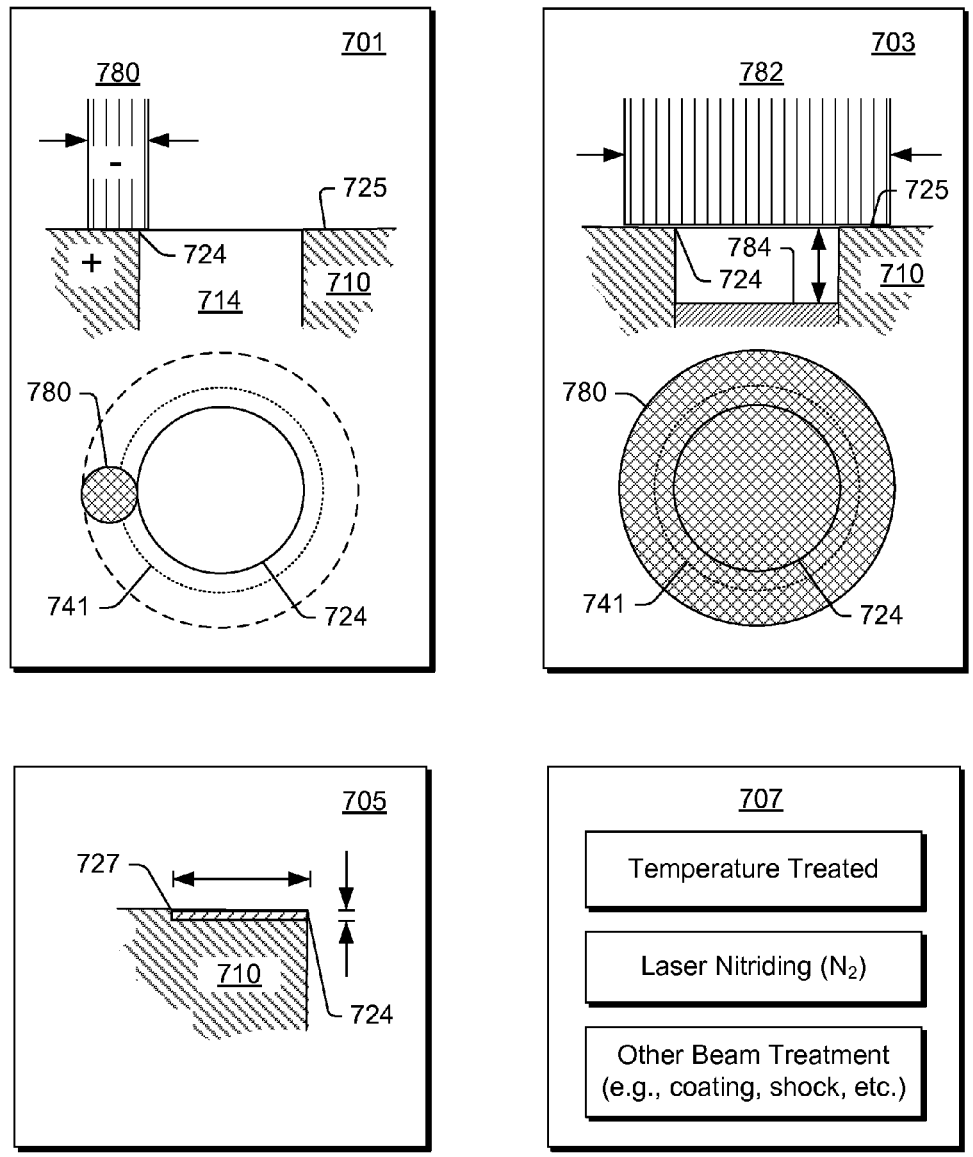
FIG. 7 is diagram of various examples of locally treating a valve seat.

FIG. 7 shows some examples of applying electromagnetic energy to a valve seat 725 that surrounds an opening 724 of a component 710, which may be constructed from an aluminum alloy. In an example 701, a beam 780 is directed to the valve seat 725 where movement of the beam 780 (or multiple beams) may be used to treat the entire periphery of the opening 724 of the component 710. As shown in the example 701, the beam 780 may optionally be negatively charged while the valve seat 725 is positively charged. In such an example, the beam 780 may be an electron beam or other type of beam with negatively charged particles.

In another example 703, a beam 782 has a larger dimension with respect to the opening 724 of the component 710. Further, a plug 784 is optionally disposed in a passage 714, for example, at a select depth or distance from the valve seat 725 and opening 724. Such a procedure may block the radiation of the beam 782 from passing or otherwise having particular effect on material of the component 710 beyond a desired distance from the valve seat 725.

An approximate diagram 705 of the valve seat 725 shows a treated or effected region 727 as having a radial dimension and an axial dimension, which may define a volume of the treated or effected region 727. While shown as being fairly even, such dimensions may vary, for example, along axial dimension or along radial dimension about a valve seat. As mentioned, beam size, coatings, plugging, etc., may be used in conjunction with a treatment modality to achieve a particular effect for a valve seat. As indicated in a block 707, a valve seat may be temperature treated using a beam, laser nitrided, or otherwise treated (e.g., coating, shock, etc.).

Figure 8:
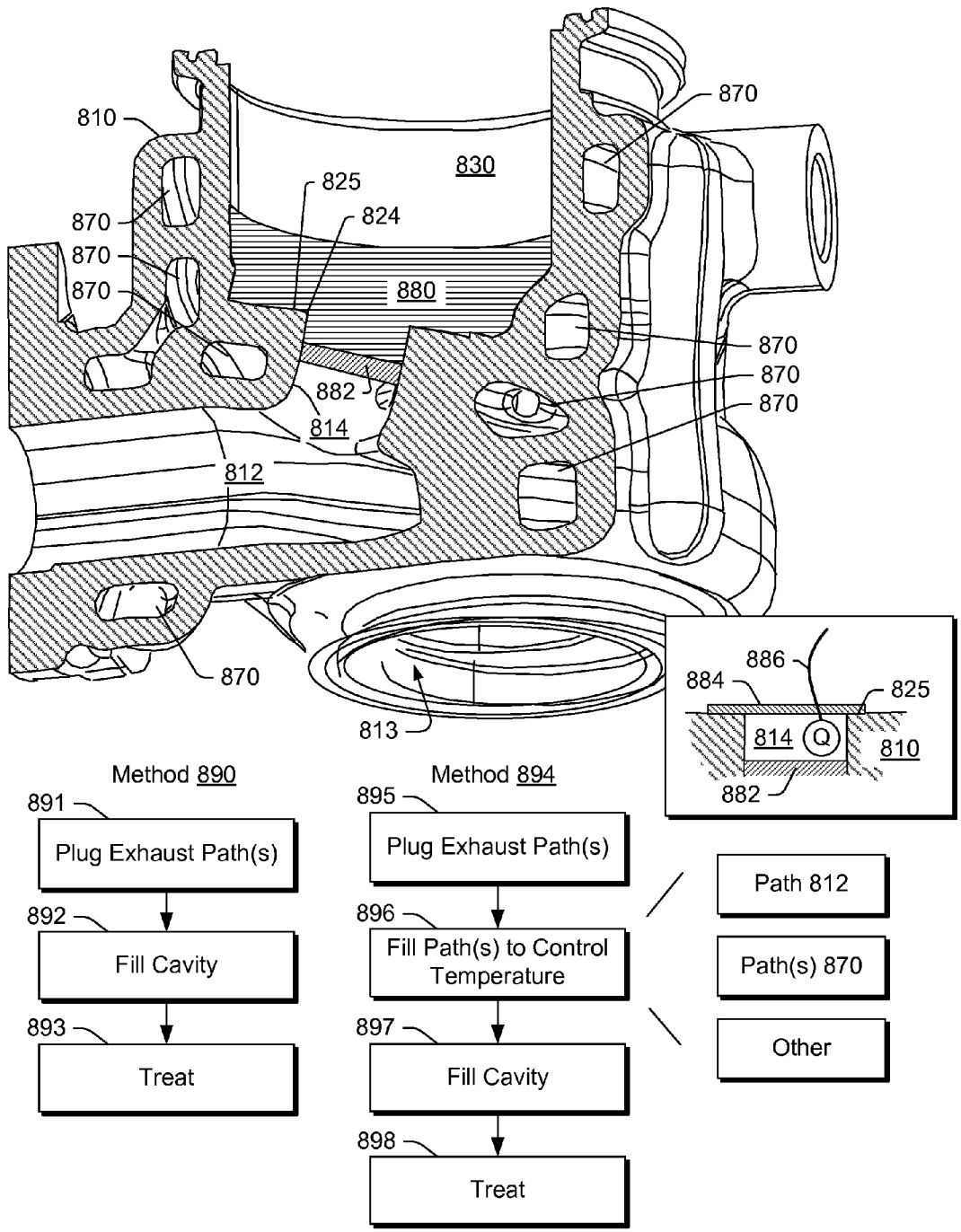
FIG. 8 is cross-sectional view of an example of a turbine housing being locally treated along with block diagrams of examples of methods for locally treating a turbine housing.

FIG. 8 shows a cross-sectional view of an example of a turbine housing 810 along with example methods 890 and 894. As shown, the turbine housing 810 includes an exhaust passage 812 that leads to an exhaust passage 814 as well as to a turbine wheel space 813. An opening 824 associated with the passage 814 leads to a chamber 830. As shown, a plug 882 is situated in the passage 814 to block it off from the passage 812. Accordingly, such a plug, optionally in conjunction with one or more other plugs (see, e.g., passage 220 of FIG. 2), may allow for filling the chamber 830, at least partially with a fluid to locally treat the housing 810 where the local treatment includes treating at least a region surrounding the opening 824 (e.g., a valve seat 825) and optionally further treating at least a portion of the passage 814.

Also shown in the example of FIG. 8 are fluid passages 870, which, during operation of the turbine housing, are typically provided for cooling. As described herein, one or more of such passages may be used in conjunction with one or more treatment techniques for purposes of heating, cooling or heating and cooling. For example, where a treatment fluid is in the chamber 830, fluid may be in one or more of the passages 870, either statically or flowing, to maintain a desired temperature profile between the treatment fluid and various portions of the turbine housing 810. Such an approach may help ensure that a treatment is localized to a valve seat region (e.g., to ensure only a valve seat region is heated to a particular temperature, experiences a particular temperature profile with respect to time, etc.). Where, for example, quenching is desired, a cooling fluid may enter one or more of the passages 870 to thereby cool the turbine housing 810 and provide for quenching, optionally in a relatively controlled manner. While the aforementioned examples for use of the passages 870 are provided where a treatment fluid is present in the chamber 830, the passages 870 may be used for other modalities of treating a valve seat (e.g., laser, mechanical, etc.).

As another example, the turbine housing 810 may be oriented with respect to gravity such that a fluid fills at least a portion of the passage 814 adjacent the valve seat 825 without any significant fluid entering the chamber 830 (e.g., a filling process that aims to achieve a particular level of fluid in the passage 814). In such an example, the fluid may be heated for a heat treatment whereby transfer of heat energy from the fluid in the passage 814 emanates radially outwardly to thereby treat the valve seat 825.

As yet another example, a plug 882 and a seal 884 may be used to isolate a portion of the passage 814 adjacent the valve seat 825 and thereby allow for localized treatment. As shown, an applicator 886 may be configured to alter conditions in the isolated portion of the passage 814. For example, an applicator may apply energy to heat, wavelength(s) to initiate or further reactions, energy to shock, etc. As described herein, a seal or a plug may be a filter or part of an applicator for treating an aluminum alloy component. For example, consider the seal 884 as being a material with particular properties to absorb laser energy where the seal is attached to a beam applicator or merely adhered to a surface.

As to the method 890, a plug block 891 provides for plugging an exhaust path or paths, a fill block 892 provides for filling a cavity with a fluid, and a treatment block 893 includes treating, which may naturally occur with the filling.

As to the method 894, a plug block 895 provides for plugging an exhaust path or paths, a fill block 896 provides for filling a path or paths to control temperature (see, e.g., the passages 812, 814 and 870), another fill block 897 to fill a cavity with a fluid, and a treatment block 898 includes treating, which may naturally occur with the filling. With respect to filling the passages 812, 814 or both, a barrier (e.g., a plug, a seal, etc.) may be inserted into one or more of the passages to control extent of filling. Accordingly, a passage designed for one purpose (i.e., flow of exhaust or cooling during operation of a turbine) may be used for another purposes (e.g., treating) to, for example, provide for a valve seat with durability for interacting with a poppet of a wastegate valve.

Figure 9:
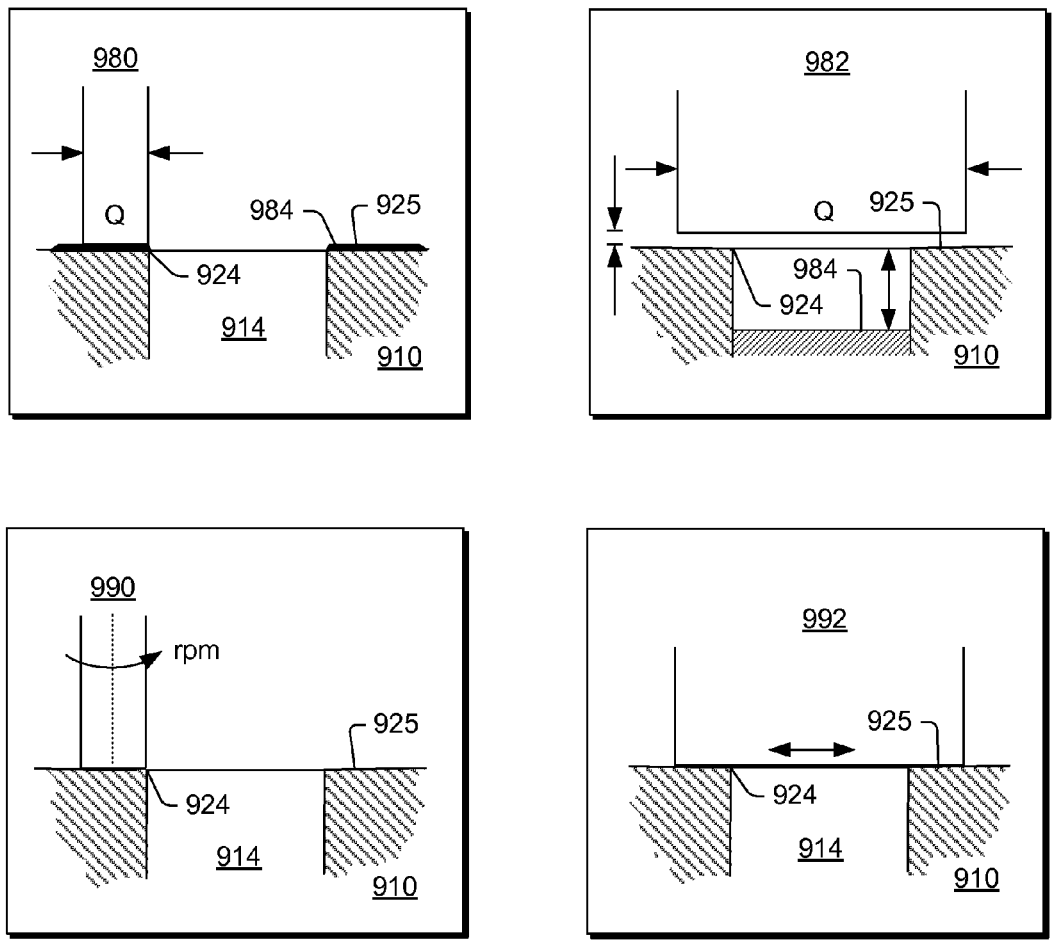
FIG. 9 is a diagram of various examples of locally treating a valve seat.

FIG. 9 shows various examples of applicators 980, 982, 990 and 992 for treating a valve seat 925 of a component 910. As shown, the applicator 980 may be configured to apply heat to a coating 984 applied to a valve seat 925 where the applicator 980 may optionally directly contact the coating 984. The applicator 982 may be used in conjunction with a barrier 984 disposed in a passage 914 of the component 910 and the applicator 982 may be a non-contact applicator such that contact does not occur between the applicator 982 and the component 910 at the valve seat 925. The applicator 990 may be a contact applicator such as a rotational tool that alters the valve seat 925. Such an applicator may be part of a preliminary procedure that prepares the valve seat 925 prior to another procedure. The applicator 992 may be a contact applicator such as an ultrasonic vibration tool that applies ultrasonic energy vibrations to the valve seat 925. Such an applicator may be part of a preliminary procedure that prepares the valve seat 925 prior to another procedure. As shown in FIG. 9, all of the applicators are configured to locally affect the valve seat 925 of the component 910. As described herein, local treatment of a valve seat of an aluminum alloy turbine housing can be beneficial for reducing effects of any of a variety of issues associated with a wastegate valve poppet interacting with the valve seat.

As described herein, various acts may be performed by a controller (see, e.g., the controller 190 of FIG. 1), which may be a programmable control configured to operate according to instructions. As described herein, one or more computer-readable media may include processor-executable instructions to instruct a computer (e.g., controller or other computing device) to perform one or more acts described herein (e.g., one or more acts of the various methods or other acts). A computer-readable medium may be a storage medium (e.g., a device such as a memory chip, memory card, storage disk, etc.). A controller may be able to access such a storage medium (e.g., via a wired or wireless interface) and load information (e.g., instructions and/or other information) into memory (see, e.g., the memory 194 of FIG. 1). As described herein, a controller may be an engine control unit (ECU) or other control unit configured to control operation of a wastegate valve (e.g., for purposes of engine performance, adaptation, etc.).

Although some examples of methods, devices, systems, arrangements, etc., have been illustrated in the accompanying Drawings and described in the foregoing Detailed Description, it will be understood that the example embodiments disclosed are not limiting, but are capable of numerous rearrangements, modifications and substitutions without departing from the spirit set forth and defined by the following claims.

What is claimed is:

1. An aluminum alloy turbine housing comprising;
   an inlet for exhaust;
   a turbine wheel space configured to receive exhaust via the inlet;
   a wastegate opening configured to receive exhaust via the inlet and to provide received exhaust to a wastegate chamber; and
   a locally hardened valve seat surrounding the wastegate opening,
   wherein the aluminum alloy turbine housing comprises a globally tempered aluminum alloy turbine housing that comprises a standard temper selected from a group consisting of standard T code tempers and wherein the locally hardened valve seat comprises a non-standard temper.

2. The aluminum alloy turbine housing of claim 1 further comprising a steel poppet configured for seating against the locally hardened valve seat.

3. The aluminum alloy turbine housing of claim 1 wherein the locally hardened valve seat comprises anti-corrosion properties for contact with steel, the anti-corrosion properties imparted by one or more local hardening processes.

4. The aluminum alloy turbine housing of claim 1 further comprising passages configured for receipt of a cooling fluid to cool the housing during operation.

5. The aluminum alloy turbine housing of claim 1 wherein the locally hardened valve seat comprises aluminum nitride.

6. The aluminum alloy turbine housing of claim 1 wherein the locally hardened valve seat is disposed in a wall of the wastegate chamber.

7. The aluminum alloy turbine housing of claim 1 wherein the locally hardened valve seat comprises one or more phase characteristics that differ from phase characteristics of another portion of the wall of the wastegate chamber due to local treatment to locally harden the valve seat.

8. A method comprising:
globally tempering an aluminum alloy turbine housing that comprises a valve seat for a wastegate valve poppet;
locally treating the valve seat to improve durability of the valve seat with respect to the wastegate valve poppet wherein the local treating comprises laser treating; and
performing one or more quality control tests on the locally treated valve seat.

9. The method of claim 8 wherein the global tempering comprises a T7 tempering.

10. The method of claim 8 wherein the local treating comprises fluid treating.

11. The method of claim 8 wherein the local treating comprises mechanical treating.

12. The method of claim 8 wherein the local treating comprises nitriding.

13. The method of claim 8 comprising inserting a barrier into a passage in the turbine housing to isolate a region of the turbine housing to be subject to the locally treating.

14. An aluminum alloy turbine housing comprising;
an inlet for exhaust;
a turbine wheel space configured to receive exhaust via the inlet;
a wastegate opening configured to receive exhaust via the inlet and to provide received exhaust to a wastegate chamber; and
a locally hardened valve seat surrounding the wastegate opening wherein the locally hardened valve seat comprises aluminum nitride.

15. A method comprising:
globally tempering an aluminum alloy turbine housing that comprises a valve seat for a wastegate valve poppet;
locally treating the valve seat to improve durability of the valve seat with respect to the wastegate valve poppet wherein the local treating comprises fluid treating; and
performing one or more quality control tests on the locally treated valve seat.

16. A method comprising:
globally tempering an aluminum alloy turbine housing that comprises a valve seat for a wastegate valve poppet;
locally treating the valve seat to improve durability of the valve seat with respect to the wastegate valve poppet wherein the local treating comprises mechanical treating; and
performing one or more quality control tests on the locally treated valve seat.

17. A method comprising:
globally tempering an aluminum alloy turbine housing that comprises a valve seat for a wastegate valve poppet;
locally treating the valve seat to improve durability of the valve seat with respect to the wastegate valve poppet wherein the local treating comprises nitriding; and
performing one or more quality control tests on the locally treated valve seat.

18. A method comprising:
globally tempering an aluminum alloy turbine housing that comprises a valve seat for a wastegate valve poppet;
inserting a barrier into a passage in the turbine housing to isolate a region of the turbine housing to be subject to local treating;
locally treating the valve seat to improve durability of the valve seat with respect to the wastegate valve poppet; and
performing one or more quality control tests on the locally treated valve seat.

* * * * *